Sept. 24, 1940. D. R. McNEAL 2,215,853
PLUG VALVE
Filed Oct. 14, 1938 2 Sheets-Sheet 1

INVENTOR
Daniel Raymond McNeal
BY
Symnestvedt & Lechner
ATTORNEYS

Sept. 24, 1940.  D. R. McNEAL  2,215,853
PLUG VALVE
Filed Oct. 14, 1938   2 Sheets-Sheet 2

INVENTOR
Daniel Raymond McNeal
BY
Synnestvedt & Lechner
ATTORNEYS

Patented Sept. 24, 1940

2,215,853

UNITED STATES PATENT OFFICE 2,215,853

PLUG VALVE

Daniel Raymond McNeal, Abington, Pa., assignor to Andale Company, Philadelphia, Pa., a corporation of Pennsylvania Application October 14, 1938, Serial No. 234,880

2 Claims. (Cl. 251—97)

This invention relates to plug valves and is especially concerned with a valve of this general type in which a tapered plug valve member is seated in a valve casing, with portions of the cooperating seating surfaces spaced from each other a substantial distance axially of the valve.

In valves of this general type, especially where valuable or dangerous fluids are being handled, it is of great importance that the valve should be accurately and tightly seated. This requirement has given rise to a number of problems, particularly where the seating surfaces of the valve are spread out over a substantial axial length thereof.

The present invention is primarily concerned with the provision of an improved mechanism for seating such valves, which mechanism at the same time provides for ready unseating thereof so as to facilitate adjustment of the valve by turning the plug.

The manner in which the foregoing objects are attained, and also others which will occur to those skilled in the art, will appear more fully from the following description referring to the accompanying drawings, in which—

Figure 1:
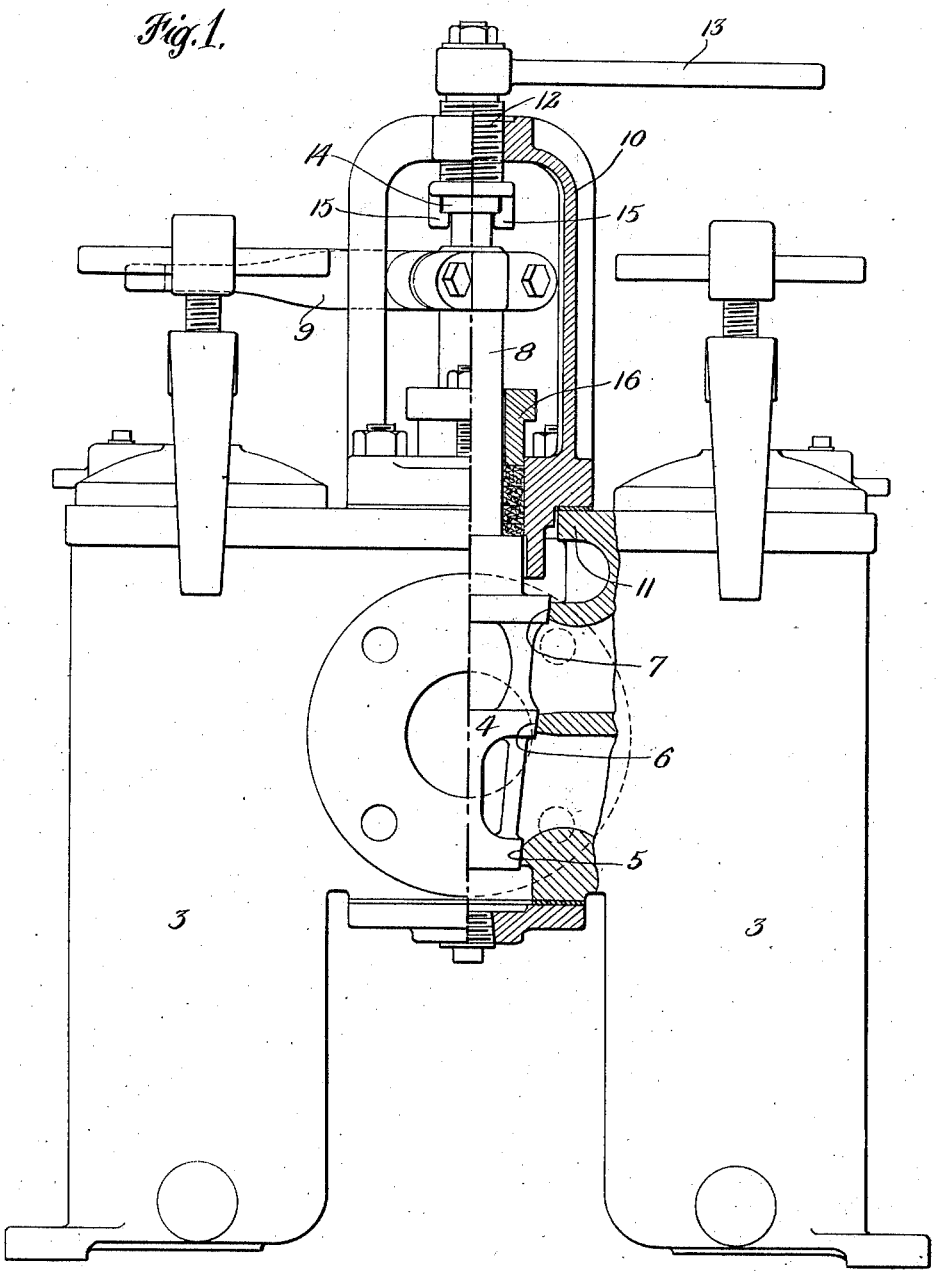
Figure 2:
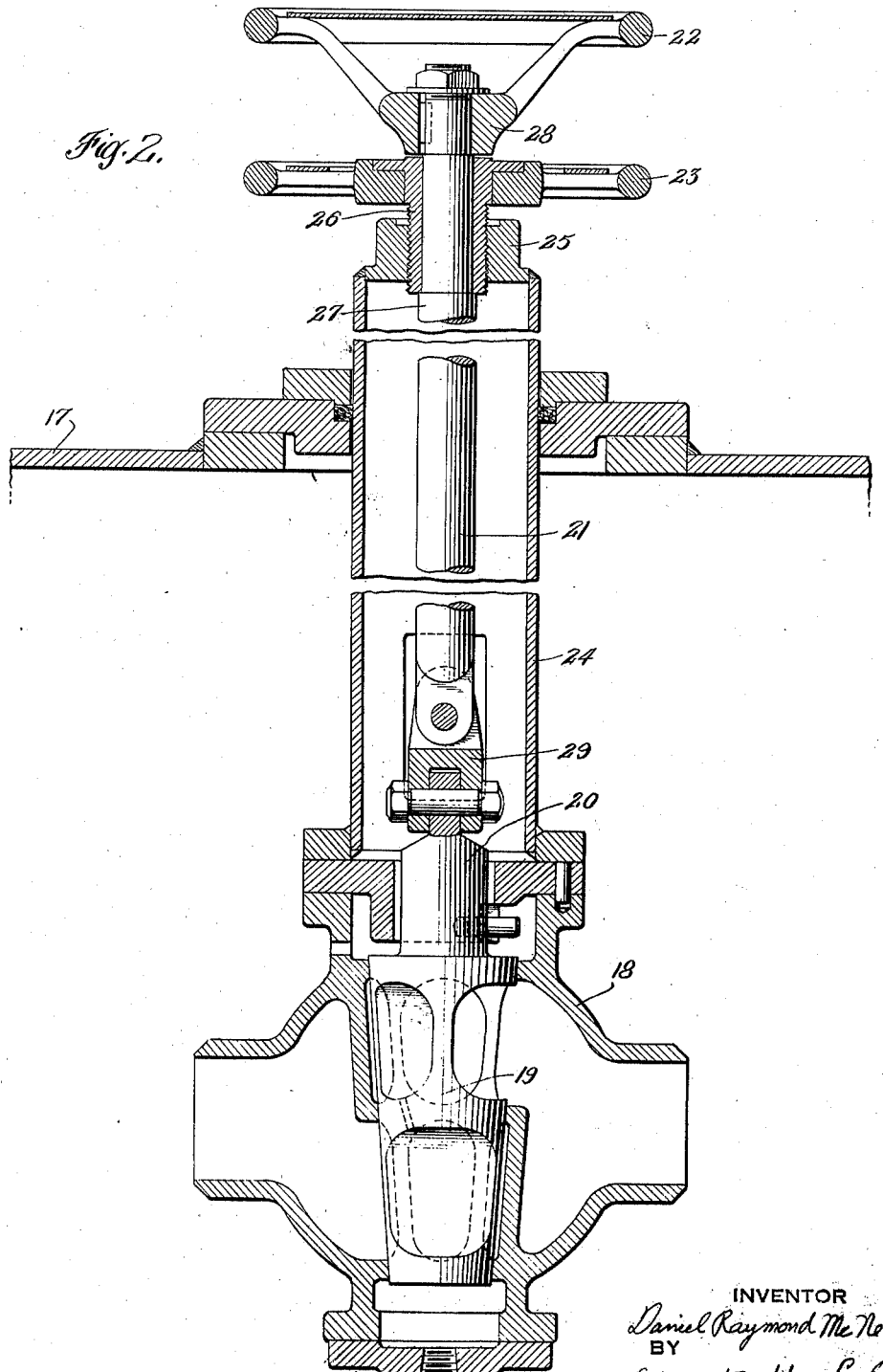

Figure 1 is an elevational view, partly broken away and shown in vertical section, of a valve mechanism constructed in accordance with the present invention and associated with a pair of strainer units adapted for alternative use, the fluid flow through the strainers being controllable by the valve; and Figure 2 is a vertical sectional view of a somewhat different form of valve mechanism, as discussed more fully hereinafter.

Referring first to the showing of Figure 1, it is noted that in fluid treatment equipment of various types, it is frequently advantageous to employ a pair of treatment units (for instance, strainers or heat exchange devices) and to associate therewith a valve and connections by means of which fluid (for instance, oil) may be caused to flow alternatively through one or the other of the treatment units.

A valve suitable for this purpose is fully disclosed in association with such a duplex system in my copending application Serial No. 190,971, filed February 17, 1938. In the arrangement shown in Figure 1, a pair of strainers appears at 3—3, the valve mechanism being interposed therebetween so as to control the flow as aforesaid. For purposes of this general type it has been found convenient to employ a plug valve of substantial axial dimension, the effective portion of the valve being divided into two general sections axially thereof so as to provide the desired control for the plurality of connections which must be used. Thus, in Figure 1, the valve member 4 has seating surfaces at 5, 6 and 7 which are spaced from each other axially of the valve, the spacing between surfaces 5 and 7 being quite great. A valve stem 8 projects upwardly from the valve and on this stem a handle 9 is mounted to provide for turning of the valve and thus controlling of the flow therethrough. A thrust absorbing yoke or other suitable bracket support 10 is mounted on the valve casing part 11 and toward its top a member 12 is threaded into an aperture in the support 10 generally in axial alignment with the valve stem 8. This member may be rotated by means of handle 13.

Because of unavoidable inaccuracies in manufacture and installation, it is a virtual impossibility to obtain in all cases an exact alignment between the member 12 or an equivalent seating and unseating device and the valve member itself and its stem. A relatively rigid connection between the member 12 and the valve stem (especially with regard to relative angling of the parts) would produce uneven seating and seating pressure of the valve in the casing. With this thought in mind the member 12 is connected with the upper end of the valve stem by a flexible joint consisting, in the arrangement of Figure 1, of a shouldered head 14 formed at the upper end of the valve stem, and a pair of undercut lugs 15—15 carried by the member 12 and engaging the head 14. These parts have sufficient clearance to provide freedom for turning of the valve stem with respect to the member 12 and also to provide for relative angling thereof as well as parallel disalignment.

As a result of the provision of this flexible joint, centering and accurate seating of the valve is accomplished by virtue of engagement of the valve seating surfaces with the cooperating surfaces in the valve casing.

In operation, when it is desired to adjust the valve by means of handle 9, the lever 13 is rotated in a direction to lift the valve slightly from its seat. After an adjustment has been made, the lever 13 is again turned so as to force the valve downwardly into its seat. The mechanism provides for a relatively heavy seating pressure, and this without interference with accurate alignment of the valve with respect to its seat, because of the flexible connection between the stem and the member 12.

If desired, a packing gland 16 between the valve casing and stem may be employed, although this gland should, of course, be so constructed as to provide clearance for disalignment and angling of the valve stem with respect to the bracket support 10 and the seating and lifting mechanism carried thereby.

Turning now to the modified arrangement of Figure 2, it is first noted that this arrangement is particularly suitable for installations in which the valve and its controlling members are spaced a substantial distance apart. As an example of such an installation, the valve may be located well downwardly in a tank, the top wall of which is indicated in Figure 2 at 17. Here the valve casing appears at 18 and the valve proper at 19, the latter having a stem 20 which is connected with an upwardly extended shaft 21 which projects above the level of the top of the tank 17 for cooperation with the turning wheel 22 and the seating and lifting wheel 23.

The thrust absorbing support for the valve seating and lifting mechanism may here take the form of a tube 24 mounted on the valve casing and also extended upwardly through the roof of the tank. At its upper end the tube 24 is provided with a member 25 into which is threaded the seating device 26 which is rotatable by means of the wheel 23. The shaft or extension 21 of the valve extends through the threaded member 26, which member 26 at its lower end is adapted to engage a shoulder 27 formed on the stem and, at its upper end, is adapted to engage the hub 28 for the wheel 22.

Raising of the valve from its seat is accomplished by rotating the handle 23 in that direction which will bring the member 26 into engagement with the hub 28 of the upper wheel 22, this upper wheel being rigidly secured to the stem. Seating of the valve is effected by rotation of the wheel 23 in the opposite direction so as to bring the lower end of member 26 into engagement with the shoulder 27 and thus transmit a seating force downwardly through the stem 21 to the valve 19.

For the purpose of permitting parallel and angular disalignment of the shaft 21 and the stem 20, a universal joint 29 is employed to couple these two parts together. A joint of this type (in contrast to the type shown in Figure 1) is used in the arrangement of Figure 2 because of the fact that not only the seating and unseating forces are transmitted through the shaft 21, but also the rotative movement of the valve when making an adjustment. Freedom for parallel disalignment of shaft 21 and the valve is afforded by a slight degree of lost motion or clearance in the pivots of the universal joint 29.

Thus the modified form of Figure 2 provides for effective and tight seating of the valve and avoids irregular pressure or bad seating at various of the seating surfaces, in spite of the fact that the seating surfaces of valve and casing are spread out over a considerable axial length of the valve body.

It will be noted that the thrust absorbing members 10 and 24 are formed with supporting means on opposite sides of the shaft. This prevents the possibility of distortion of these members and ensures accurate alignment of the stress lines with the center line of the plug, which is very important especially during seating of the valve.

What I claim is:

1. For valve mechanism of the character described having a valve casing and a valve plug adapted to be seated therein, an operating shaft connected to the plug, a flexible joint in said shaft providing freedom for relative angling of the plug and the shaft and adapted to positively transmit axial movement in both directions to the plug for seating and unseating thereof, means associated with said shaft for turning the plug, and mechanism for seating and unseating the plug including a support fixed with respect to the valve casing, a member in screw-threaded engagement with the support and associated with said shaft in a manner to transmit the seating and unseating forces to the plug through the shaft and said flexible joint while permitting freedom for rotation of the plug and its shaft with respect to said member.

2. For valve mechanism of the character described having a valve casing and a rotatable valve plug adapted to be seated therein, an operating shaft arranged with its axis in alignment with the axis of said rotatable plug, a flexible joint in said shaft providing freedom for relative angling of the plug and the shaft and adapted to positively transmit axial movement in both directions to the plug for seating and unseating thereof, means associated with the shaft for turning the plug, and mechanism for moving the plug in an axial direction in order to seat or unseat it, said mechanism including a thrust absorbing member fixed with respect to the valve casing by supporting means at opposite sides of the shaft, and a plug seating and unseating member in screw-threaded engagement with said thrust absorbing member and associated with the shaft in a manner to transmit thrust to the plug, the axis of the threads being in alignment with the axis of the shaft and the axis of the plug whereby the line of thrust is in alignment with the axis of the plug.

DANIEL RAYMOND McNEAL.